Dec. 13, 1932.                H. SMITH                 1,891,116
                    ROLLING OF COMPOSITE GLASS STRIPS
                          Filed June 3, 1932

Inventor.
Harry Smith
By Thomson, Kennedy Campbell
Attys.

Patented Dec. 13, 1932

1,891,116

UNITED STATES PATENT OFFICE

HARRY SMITH, OF ST. HELENS, ENGLAND, ASSIGNOR TO PILKINGTON BROTHERS LIMITED, OF LIVERPOOL, ENGLAND

ROLLING OF COMPOSITE GLASS STRIPS

Application filed June 3, 1932, Serial No. 615,092, and in Great Britain June 8, 1931.

This invention relates to the continuous rolling of composite glass strips, and has for its object an improved process of producing a flat composite strip.

In the process of rolling composite glass strips by the continuous process, in which the rate of rolling is necessarily slow, it is found that the edge portions of the composite strip become deformed generally by bending up, and that sometimes cracks occur at the edges.

According to the invention the second rolled strip is made of greater width than the first rolled strip, so that its edge portions overlap those of the first rolled strip. It is found that then the above-mentioned deformation and cracking does not occur.

The invention is applicable with advantage to any rolling process in which the first strip has become cooled more than the second strip at the moment of formation of the composite strip.

It is believed that the reason for the defects mentioned above lies in the considerable temperature difference in the edge-portions of the two strips, due to the cooling of the first strip, which is greater at the edge portions than elsewhere. When, according to the invention, a mass of hot glass is caused to overlap the edge of the cooler first strip, this is heated by the hot glass and the temperature difference when the composite strip solidifies is lessened.

The invention will be described as applied to the known process of rolling composite strip, in which a first strip is rolled and then molten glass is rolled on to the first strip to form the second strip.

Figure 1:
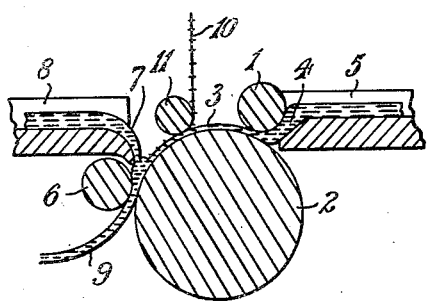
Figure 2:
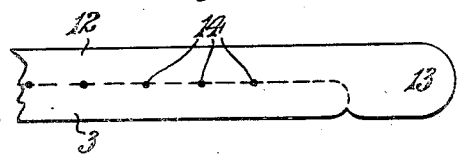

In the accompanying drawing, Figure 1 shows diagrammatically in cross-section a rolling apparatus of the type mentioned and Figure 2 is a cross-section of a portion of a composite strip made in accordance with the invention.

Referring to Figure 1, the smaller roller 1 co-acts with the large roller 2 to form a first strip 3 from the molten glass 4 in the conduit 5. A second small roller 6 rolls the molten glass 7 in the conduit 8 on to the surface of the first strip 3 to form a composite strip 9. When the process is employed to make a strip of wire net glass, a wire net 10 is pressed on to the surface of the first strip 3 by the roller 11.

Referring to Figure 2, a portion of the first strip 3 is indicated in its form as originally rolled, by a dotted line. The second strip 12 is formed of a greater width than the first strip, so that a mass of glass 13 overlaps, and embraces the edge of the first strip 3.

The dots 14 indicate the wires of a wire net when this is interposed between the two strips. The invention however is applicable to a composite strip without wire net, formed, for example, of two strips of glass of different kinds.

Having described my invention, I declare that what I claim and desire to secure by Letters Patent is:—

1. Process of making a composite strip of glass by continuously rolling a first strip of width sufficient to give a strip of the desired width and by rolling thereon a second and wider strip of which the edges overlap the edges of the first strip.

2. Process of making a composite strip of glass by continuously rolling a first strip of width sufficient to give a strip of the desired width and by supplying molten glass to the surface of the said strip and rolling it thereon to form a second and wider strip of which the edges overlap the edges of the first strip.

3. Process of making a composite strip of glass by continuously rolling a first strip of width sufficient to give a strip of the desired width by rolling thereon a second and wider strip of which the edges overlap the edges of the first strip and interposing a wire net between the first and second strips.

4. Process of making a composite strip of glass by continuously rolling a first strip of width sufficient to give a strip of the desired width by supplying molten glass to the surface of the said strip and rolling it thereon to form a second and wider strip of which the edges overlap the edges of the first strip and interposing a wire net between the first and second strips.

In witness whereof I have affixed my signature hereto.

HARRY SMITH.